US 6,619,134 B1

(12) United States Patent
Kinnunen et al.

(10) Patent No.: US 6,619,134 B1
(45) Date of Patent: Sep. 16, 2003

(54) MEASURING DEVICE FOR MEASURING SMALL FORCES AND DISPLACEMENTS

(75) Inventors: Paavo Kinnunen, Espoo (FI); Veikko Mönkkönen, Helsinki (FI)

(73) Assignee: Kibron Inc. Oy, Helsinki (FI)

( * ) Notice: Subject to any disclaimer, the term of this patent is extended or adjusted under 35 U.S.C. 154(b) by 0 days.

(21) Appl. No.: 09/831,881

(22) PCT Filed: Dec. 17, 1999

(86) PCT No.: PCT/FI99/01055

§ 371 (c)(1),
(2), (4) Date: Jul. 16, 2001

(87) PCT Pub. No.: WO00/40923

PCT Pub. Date: Jul. 13, 2000

(30) Foreign Application Priority Data

Dec. 31, 1998 (FI) .................................................. 982845

(51) Int. Cl.[7] ................................. G01J 5/46; G01L 1/24
(52) U.S. Cl. ................. 73/800; 73/862.624; 250/231.19
(58) Field of Search ...................... 73/862.324, 862.624, 73/862.637, 800; 250/231.19

(56) References Cited

U.S. PATENT DOCUMENTS

| 4,047,586 A | | 9/1977 | Dlugos | |
| 4,129,191 A | | 12/1978 | Kanning | |
| 4,403,144 A | * | 9/1983 | Strahan et al. | 250/227.11 |
| 5,291,014 A | * | 3/1994 | Brede et al. | 250/227.21 |
| 5,428,446 A | * | 6/1995 | Ziegert et al. | 250/231.11 |
| 5,548,902 A | | 8/1996 | Ernst | |
| 5,737,070 A | | 4/1998 | Kato | |
| 6,222,184 B1 | * | 4/2001 | Kinnunen | 118/402 |

FOREIGN PATENT DOCUMENTS

| DE | 36 36 266 | | 4/1988 | |
| EP | 0 300 965 A1 | | 1/1989 | |
| EP | 0 551 165 A1 | | 7/1993 | |
| EP | 0 791 812 A1 | | 8/1997 | |
| SE | WO98/1142 | * | 3/1998 | G01N/13/02 |
| WO | WO98/11421 | | 3/1998 | |

* cited by examiner

Primary Examiner—Max Noori
Assistant Examiner—Lilybett Martir
(74) Attorney, Agent, or Firm—Armstrong, Westerman & Hattori, LLP

(57) ABSTRACT

The object of the invention is a measuring device for measuring small forces and displacements having in a body (1) of the device a detector means comprising a light source (4) and a position-sensitive detector (5), and a sensing means comprising a spring means (2) to be loaded by a force to be measured and a shading means (3) mounted to this spring means (2), which shading means moves under the influence of the force loading the spring means (2) in a light source (4) of the detector means, the beam being directed towards an active surface of the detector (5). It is characterizing for the invention that the detector means and the sensing means are arranged to a common clamp (8) arranged to the body (1) of the device.

8 Claims, 1 Drawing Sheet

MEASURING DEVICE FOR MEASURING SMALL FORCES AND DISPLACEMENTS

OBJECTS OF THE INVENTION

The object of this invention is a measuring device for measuring small forces and displacements having in a body of the device a detector means comprising a light source and a position-sensitive detector, and a sensing means comprising a spring means to be loaded by a force to be measured and a shading means mounted to this spring means, which shading means moves under the influence of the force loading the spring means in a light beam of the light source of the detector means, the beam being directed towards an active surface of the detector.

REVIEW OF RELATED ART

The patent publication FI 963612 discloses a device for measuring a surface pressure of a film formed at the interface of a liquid and gaseous phase. In the device known from this publication, a position-sensitive detector is employed together with a light source in the detection of the displacement of a sensor caused by the small force to be measured.

In this known device the compensation of errors due to the temperature becomes, however, difficult and tedious in a wide range of temperature. Although a part of the errors can be corrected with calibration procedures and/or by using suitable compensation solutions e.g. in the control electronics of the devices, these calibration and compensation procedures become tedious and laborious. Other known devices, like ordinary microbalances, are on their part expensive, spacetaking and they cannot be thought as portable measuring devices.

SUMMARY OF THE INVENTION

The aim of the invention is to provide a device suitable for measuring small forces, like e.g. surface tension and surface pressures and small displacements, where the influence of the temperature of the environment to the measuring result is very small. In addition, the object is to provide a measuring device which has small physical dimensions, which is portable and suitable also for field work outside the laboratories.

This is accomplished according to the invention so that the detector means and the sensing means are arranged into a common clamp arranged in the body of the device.

According to a preferable embodiment of the invention, the detector means and the sensing means are arranged into a common clamp made of a material having a small coefficient of temperature expansion, preferably e.g. of bakelite. Other preferred alternatives are e.g. ceramic materials. In this embodiment the relative mutual position of the detector means and the sensing means remain the same while the temperature of the environment is varying. The clamp has preferably an U-formed shape, the light source and the position-sensitive detector of the sensing means being located towards each other in different legs of the said U-formed clamp, and the shading means of the sensing means being at least partially in the space between these legs.

According to the invention the detector means comprises a light source, which is preferably e.g. a light emitting diode, and a position-sensitive detector.

The position-sensitive detector is as such of a known type which comprises a silicon substrate and a layer structure formed thereon. The outermost layer is resistive, that is an active P-layer. The incident light which falls on the active P-layer is converted to an electrical charge which is proportional to the light energy. This charge is driven through the P-layer to electrodes connected to the layer. As the resistivity of the layer is constant, a photo current is obtained at the electrodes, which is inversely proportional to the distance between the incident light spot and the electrodes.

Between the light source and the position-sensitive detector, preferably close to the light source, optical means, preferably a lens, is arranged in a preferred embodiment of the invention for directing the light beam of the light source towards the active area of the light-sensitive detector. The light emitted from the light source can be in the visible or in the infrared spectrum of light. In a preferred embodiment of the invention, the intensity of the light emitted by the light source is modulated.

According to the invention, the spring means of the sensing means transforming the force applied thereto into a linear movement, is preferably a leaf spring, made of a material having a low coefficient of thermal expansion, preferably of e.g. quartz glass. Other preferred alternatives are e.g. ceramic materials. In a preferred embodiment of the invention this spring means of the sensing means has a substantially lying U-shaped form so that the imaginary plane through its legs is vertical and that the end of its one leg is mounted to the said clamp and to the end of the other leg a preferably planar shading means is arranged, the shading means having means for bringing the force to be measured into connection with the spring means.

The shading means arranged to the spring means is arranged according to a preferred embodiment of the invention between the light source and the detector substantially perpendicularly to the light beam of the light source of the detector means, the beam being directed towards the light-sensitive detector. The shading means has in a preferred embodiment of the invention such a form that its edge projecting to the light beam is straight and preferably perpendicular to the direction of the applied force at least in that part which is within the light beam. When the shading means moves in the light beam under the influence of the force to be measured applied to the spring means, a part of the light emitted by the light source hits the active surface of the light-sensitive detector of the sensing means.

In another preferred embodiment of the invention, a slot or an opening is arranged to the planar shading means through which a part of the light beam of the light source directed towards the active surface of the detector hits the detector. The slot is preferably arranged so that it is across the direction of the movement of the shading means when this moves in the said light beam under the influence of the force to be measured. In a preferred embodiment of the invention, optical means is arranged between the shading means having a slot and the detector in such a way that these optical means form an image of the slot onto the active surface of the detector. In a preferred embodiment these optical means consist of a mirror. The detector is placed in this embodiment preferably e.g. to the horizontal part of the U-shaped clamp or even to the same leg with the light source.

In a preferred embodiment of the invention, the clamp into which the detector means and the sensing means are arranged is mounted to the body of the device with suitable suspension means for bringing this clamp in such a position where the force deflecting the spring means of the sensing means is substantially perpendicular to the spring means and in a vertical plane going through the spring means. In this preferred embodiment the lateral movement of the spring means can be avoided.

In another preferred embodiment of the invention, the device comprises means in communication with the suspension means for sensing the position of the clamp.

The device according to the invention can preferably be used for weighing small masses, preferably in a measuring range of 0–200 mg, and a resolution of 0.1 µg can be attained in this measuring range. The attainable resolution depends on the resolution of the position-sensitive detector employed.

BRIEF DESCRIPTION OF THE DRAWING

A preferred embodiment of the invention is described in the following with a drawing, where.

DETAILED DESCRIPTION OF THE PREFERRED EMBODIMENTS

Figure 1:
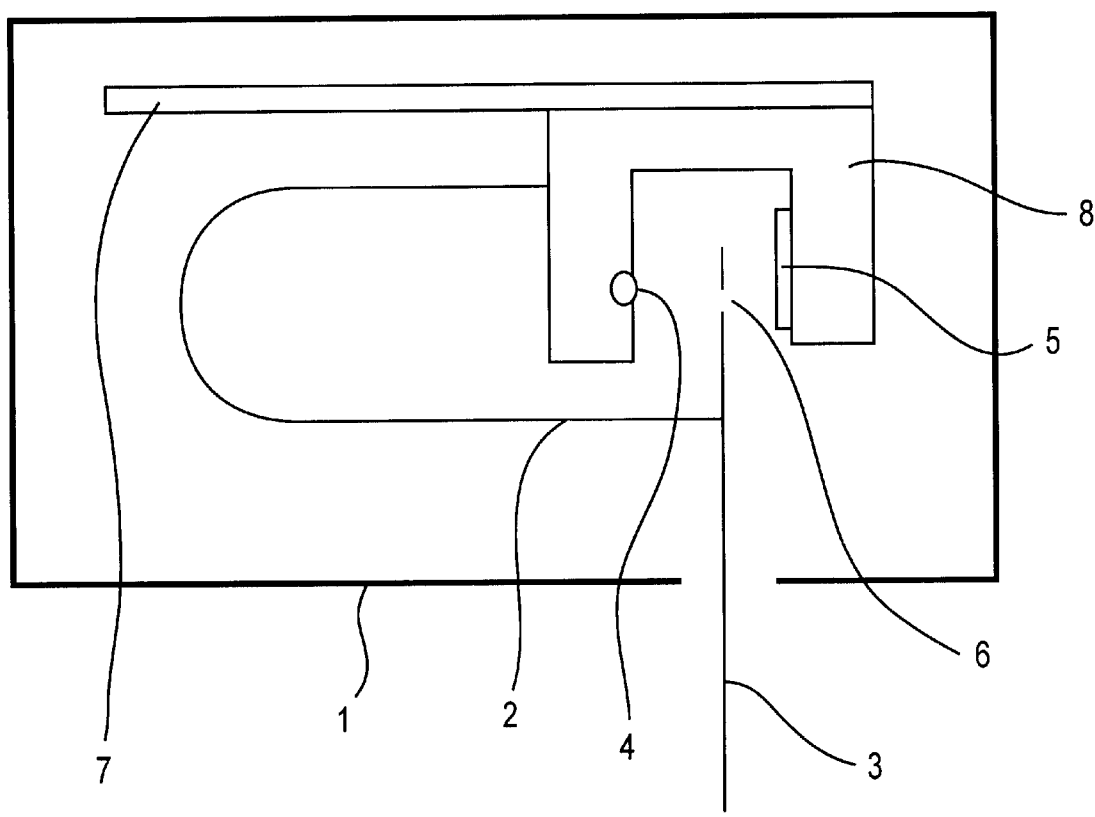
FIG. 1 shows a device according to the invention schematically in a lenghtwise side projection.

The device according to the invention comprises a clamp 8 arranged to a body 1, one or several printed circuit boards 7 arranged to the clamp 8 comprising the measuring and control electronics of the device, a detector means comprising a light source 4 and a position-sensitive detector 5, a sensing means comprising a spring means 2 and a shading means 3, and power supply means, means for control and operation of the measuring device, and a display, which are not shown in the drawing. The body 1 is made of rigid material, preferably e.g. of an aluminium tube having a rectangular cross-section and having its end tightly closed with plug-like means of the same material.

The detector means comprises the light source 4 and the position-sensitive detector 5, which are mounted into the clamp 8 having a cross-section of a substantially U-shaped form, made of a material having a small coefficient of thermal expansion, preferably e.g. of bakelite. The clamp 8 is arranged to the body 1 so that its legs are directed downwards in the operating position. The light source 4 is arranged to the one end of the clamp 8, onto its inner surface, and to its another leg, onto its inner surface, the position-sensitive detector 5 is arranged so that the active surface of the detector 5 is in the light beam of the light source 4. The inner surfaces of the clamp 8 are preferably at least partly treated not to reflect light.

The sensing means comprises a spring means 2 and a shading means 3 arranged thereto and which are mounted to the clamp 8. The spring means is made of a reversibely deformable material having a small coefficient of thermal expansion, e.g. of quartz glass. One end of the spring means 2 is mounted to the clamp 8 and to its other free end is mounted a preferably planar shading means 3 so that the shading means 3 projects between the legs of the clamp 8, to the light beam of the light source 4 directed towards the detector 5. The planar shading means 3 has in the region of the light beam of the light source 4 a horizontal slot 6 and it is arranged between the legs of the clamp 8 so that a part of the light beam of the light source 4 going through the slot 6 hits the active surface of the detector 5. In another alternate embodiment of the invention the shading means 3 has no slot, whereby an edge of the shading means 3 projecting into the light beam limits the light hitting the active surface of the detector 5.

The cross-section of the spring means 2 has preferably elliptic, rectangular or in another corresponding way flat form so that the minimum dimension of the cross-section of the spring means 2 is parallel to the force applied to the spring and preferably at maximum half of the dimension perpendicular to this dimension, whereby the movement of the free end of the spring means 2 is substantially vertical in the intended operating position of the device.

The edge of the shading means 3 directed away from the clamp 8 is provided with means to which the force to be measured is applied directly or by means of suitable connecting means. For this purpose the body has an opening through which the connecting means can be attached to the shading means 3. In a preferred embodiment of the invention a sensing plate is suspended with suitable suspension means from the said lower edge of the shading means 3 for measuring a surface tension.

When the force to be measured is applied to the shading means 3, the spring means 2 deflects and light from the light source 4 hits the active surface of the position-sensitive detector 5 through the slot 6 in the shading means 3. The position of the illuminated area hitting the active surface of the detector through the slot 6 changes according to the deflection of the spring means 2 and at the same time also the electrical signal given by the detector 5. The detector 5 is connected to the measuring and control electronics of the measuring device for transforming an output current of the detector 5 into a measuring result of the force being measured.

Due to its small current consumption, the device can also be accumulator- or battery-operated, whereby the accumulators or batteries functioning as power supply are mounted inside the body 1 of the device.

What is claimed is:

1. A device for measuring small forces and displacements comprising, in a body (1) of the device,
   a detector means comprising a light source (4) and a position-sensitive detector (5), and
   a sensing means comprising a spring means (2) to be loaded with a force to be measured and
   a shading means (3) mounted to the spring means (2), which shading means moves under the influence of the force loading the spring means (2) in a light beam of the light source (4) of the detector means, the beam being directed towards an active surface of the detector (5),
   characterized in that the detector means and the sensing means are arranged into a common clamp (8) arranged in the body (1) of the device, which clamp comprises a material having a small coefficient of thermal expansion,
   wherein the spring comprises a first end mounted onto the common clamp, and wherein the shading means is mounted onto a second end of the spring.

2. The device according to claim 1, characterized in that the spring means (2) of the sensing means includes a substantially U-shaped form and that the first end includes one of the legs of the U-shaped form and the second end includes the other leg of the U-shaped form.

3. The device according to claim 2, characterized in that the legs of the U-shaped form are perpendicular to a direction of the force to be measured and a maximum cross-sectional dimension of the spring means (2) of the sensing means in the direction of the applied force to be measured is at most half of a dimension of the cross-section perpendicular to this direction.

4. The device according to claim 3, characterized in that the cross-section of the spring means (2) of the sensing means is rectangular.

5. The device according to claim 3, characterized in that the cross-section of the spring means (2) of the sensing means is elliptical.

6. The device according to claim 1, characterized in that the spring means (2) of the sensing means is of quartz glass.

7. The device according to claim 1, characterized in that the edge of the planar shading means (3) projecting to the light beam directed from the light source (4) of the detector means to the detector (5) is straight and perpendicular to the direction of the force to be measured.

8. The device according to claim 1, characterized in that the shading means (3) has a slot (6) perpendicular to the moving direction of the shading means (3), through which slot a part of the light beam of the light source (4) directed towards the active surface of the detector (5) hits the detector (5).

* * * * *